(12) United States Patent
Ahn et al.

(10) Patent No.: US 9,253,049 B2
(45) Date of Patent: Feb. 2, 2016

(54) REAL-TIME SERVICE MONITORING APPARATUS AND METHOD USING TIME STAMP

(75) Inventors: Jeong-Gyun Ahn, Daejeon (KR); Sung-Soo Kim, Seoul (KR); Jong-Hoon Eom, Daejeon (KR); Yong-Sik Kwon, Daejeon (KR)

(73) Assignee: KT Corporation, Seongnam (KR)

( * ) Notice: Subject to any disclaimer, the term of this patent is extended or adjusted under 35 U.S.C. 154(b) by 348 days.

(21) Appl. No.: 13/141,896

(22) PCT Filed: Dec. 23, 2009

(86) PCT No.: PCT/KR2009/007718
§ 371 (c)(1),
(2), (4) Date: Jun. 23, 2011

(87) PCT Pub. No.: WO2010/074506
PCT Pub. Date: Jul. 1, 2010

(65) Prior Publication Data
US 2011/0273995 A1 Nov. 10, 2011

(30) Foreign Application Priority Data
Dec. 23, 2008 (KR) .......................... 10-2008-0132673

(51) Int. Cl.
*H04L 12/26* (2006.01)
*H04L 12/24* (2006.01)
(52) U.S. Cl.
CPC ........ *H04L 41/5022* (2013.01); *H04L 41/5003* (2013.01); *H04L 41/5035* (2013.01); *H04L 43/0829* (2013.01); *H04L 43/0852* (2013.01); *H04L 43/106* (2013.01)

(58) Field of Classification Search
USPC ................................... 370/241, 229, 236, 242
See application file for complete search history.

(56) References Cited

U.S. PATENT DOCUMENTS

| | | | |
|---|---|---|---|
| 6,807,156 B1 | 10/2004 | Veres et al. | |
| 7,200,158 B2 * | 4/2007 | Gustin | 370/509 |
| 7,453,815 B1 * | 11/2008 | Grabelsky et al. | 370/241 |
| 2004/0058652 A1 | 3/2004 | McGregor et al. | |
| 2006/0104218 A1 * | 5/2006 | Kako | 370/252 |

(Continued)

FOREIGN PATENT DOCUMENTS

| | | |
|---|---|---|
| KR | 10-0544217 B1 | 1/2006 |
| KR | 10-0584394 A | 8/2006 |

*Primary Examiner* — Joseph Bednash
(74) *Attorney, Agent, or Firm* — Sughrue Mion, PLLC

(57) ABSTRACT

A real-time service monitoring apparatus and method using a time stamp is provided. The real-time service monitoring apparatus includes: a packet reception and classification block configured to generate a first time stamp whenever receiving a packet, and classify the received packet into a time synchronization packet or a real-time monitoring packet; a packet processing and switching block configured to process the classified packet depending on whether the packet is the time synchronization packet or the real-time monitoring packet, and switch the processed packet to a destination address; a packet classification and transmission block configured to classify the switched packet depending on whether the packet is the time synchronization packet or the real-time monitoring packet, generate a second time stamp for the classified packet, and transmits the packet; and a real-time monitoring block configured to compute a real-time monitoring parameters for each flow using the generated first and second time stamps, in order to monitor the real-time service.

22 Claims, 6 Drawing Sheets

(56) References Cited

U.S. PATENT DOCUMENTS

| | | |
|---|---|---|
| 2006/0153174 A1* | 7/2006 | Towns-von Stauber et al. .......................... 370/356 |
| 2007/0115850 A1* | 5/2007 | Tsuchiya et al. .............. 370/252 |
| 2008/0019398 A1* | 1/2008 | Genossar et al. ............. 370/498 |
| 2009/0067535 A1* | 3/2009 | Koudo et al. ................. 375/295 |
| 2010/0125661 A1* | 5/2010 | Perala et al. .................. 709/224 |

* cited by examiner

REAL-TIME SERVICE MONITORING APPARATUS AND METHOD USING TIME STAMP

CROSS REFERENCE TO RELATED APPLICATION

This application claims priority from Korean Patent Application No. 10-2008-0132673, filed on Dec. 23, 2008, in the Korean Intellectual Property Office, the contents of which is incorporated herein by reference in its entirety.

BACKGROUND

1. Technical Field

Exemplary embodiments of the present invention relate to a real-time service monitoring apparatus and method using a time stamp in a network node; and, more particularly, to a real-time service monitoring apparatus and method which uses a time stamp to measure a packet loss or latency in real time in a network equipment such as an Ethernet switch without an additional device, and provides the measurement result to monitor a real-time service such as Internet Protocol Television (IPTV) or video phone.

2. Description of Related Art

Conventional traffic monitoring technologies can measure the quality of a network service only in an end-to-end manner because of the characteristic of the network service. Furthermore, dedicated monitoring equipments are installed in the network to measure the quality of the service. For example, a service which is provided using a tap or the like can be monitored at a specific network node, if necessary.

In the conventional technologies, however, the dedicated monitoring equipment should be installed in a large number of equipments which are network nodes. Such an installation costs a great deal, and is almost impossible to implement. Therefore, it is almost impossible to accurately find where a problem occurred or which problem occurred, although the quality of a real-time service such as IPTV or Voice over Internal Protocol (VoIP) is degraded.

That is, various applied programs or protocols mounted in the internet service are designed by an end-to-end concept in the conventional technologies. Therefore, although a problem occurs in the service, only a terminal can recognize the problem. On the other hand, the network equipments in charge of transmission have a difficulty in grasping the state of the service.

Therefore, to monitor a real-time service on a network, systems configured to monitor the real time service should be installed on the network. However, since such monitoring systems cost a great deal, it is almost impossible to install the systems in every network equipment.

For example, a real-time service terminal supporting the real-time service can recognize whether a traffic problem such as packet loss, frame loss, delay, or jitter occurs or not. However, even the real-time service terminal cannot check at which equipment a problem occurred and which problem occurred. This may suggest that the traffic management of the network for the real-time service is not performed smoothly.

In the conventional technologies, a tap may be set in the network such that some flows are sampled to measure a packet loss, delay, a jitter and so on. However, since the quality of the service is analyzed statistically, it is impossible to directly analyze the service.

Therefore, the conventional real-time service monitoring technologies cannot directly measure the quality of the service across the entire path. If the conventional technologies are used to measure the service quality across the entire path, the cost may increase by geometric progression.

In other words, in the real-time service quality monitoring technology, an image quality is measured at a head-end stage, and sampling is used to measure the image quality at an edge stage. Furthermore, the image quality is measured at a terminal. However, a broadcasting server cannot sample and analyze whether a service is smoothly transmitted to a subscriber network or not, or grasp the state of the service in a Set Top Box (STB), and cannot acquire information on intermediate nodes.

Accordingly, a traffic monitoring server cannot find a network equipment in which a problem occurs on the network, and cannot check in real time which problem is occurring on the network. The network management for the real-time service is not performed smoothly.

SUMMARY

An embodiment of the present invention is directed to a real-time service monitoring apparatus and method which uses a time stamp to measure a packet loss or latency in real time in a network equipment such as an Ethernet switch without an additional device, and provides the measurement result to monitor a real-time service such as IPTV or video phone.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a real-time service monitoring apparatus using a time stamp includes: a packet reception and classification block configured to generate a first time stamp whenever receiving a packet, and classify the received packet into a time synchronization packet or a real-time monitoring packet; a packet processing and switching block configured to process the classified packet depending on whether the packet is the time synchronization packet or the real-time monitoring packet, and switch the processed packet to a destination address; a packet classification and transmission block configured to classify the switched packet depending on whether the packet is the time synchronization packet or the real-time monitoring packet, generate a second time stamp for the classified packet, and transmits the packet; and a real-time monitoring block configured to compute a real-time monitoring parameters for each flow using the generated first and second time stamps, in order to monitor the real-time service.

The real-time service monitoring apparatus may further include: a time stamp storage block configured to classify the generated time stamp of the packet into a time-synchronization time stamp, a real-time monitoring time stamp, and time stamps of transmitted (Tx) and received (Rx) packets, and store the classified time stamps; a time synchronization block configured to synchronize the time of the real-time service monitoring apparatus using the stored time-synchronization time stamp; and a monitoring platform interoperation block configured to transmit the result monitored by the real-time monitoring block to a real-time monitoring server.

In accordance with another embodiment of the present invention, a real-time service monitoring method using a time stamp includes: generating a first time stamp whenever receiving a packet, and classifying the received packet into a time synchronization packet or a real-time monitoring packet; processing the classified packet depending on whether the packet is the time synchronization packet or the real-time monitoring packet, and switching the processed packet to a destination address; classifying the switched packet depending on the packet is the time synchronization packet or the real-time monitoring packet, generating a second time stamp for the classified packet, and transmitting the packet; and computing a real-time monitoring parameter for each flow using the generated first and second time stamps to monitor the real-time service.

The real-time service monitoring method may further include: synchronizing the time of the real-time service monitoring method using the time stamp of the time synchronization packet; and transmitting the monitoring result to a real-time monitoring server, the monitoring result being obtained in said computing a real-time monitoring parameter for each flow using the generated first and second time stamps to monitor the real-time service.

In accordance with the embodiments of the present invention, the time stamps are used to measure the network parameters such as an inter-packet jitter, a packet loss, packet latency in equipment, and the sequence number of a packet in real time, and the feature of the real-time service is analyzed to control the priority of a flow, in order to monitor the state of the network service for the real-time service in real time. When a problem occurred in the real-time service due to a problem on the network, the equipment in which the problem occurred and the occurrence cause may be monitored in real time, which makes it possible to stably operate the real-time service.

That is, when a problem occurs in the real-time service due to a problem on the network, the equipment and the occurrence cause are monitored in real time, based on the real-time Ethernet switch and the real-time monitoring platform which may measure important parameters having an effect on the real-time service in real time. Therefore, it is possible to stably operate the real-time service.

DETAILED DESCRIPTION

Figure 1:
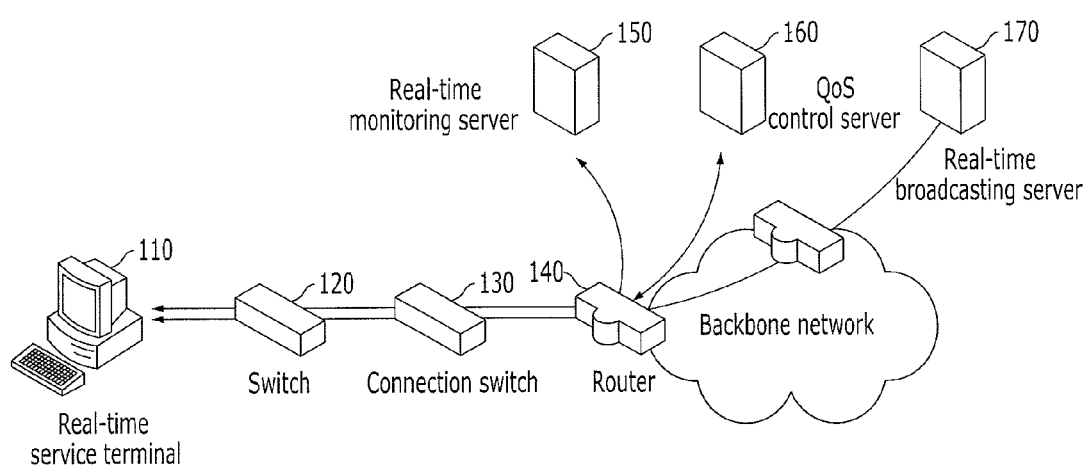
FIG. 1 is a configuration diagram of a real-time service monitoring network to which embodiments of the present invention are applied.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 is a configuration diagram of a real-time service monitoring network to which embodiments of the present invention are applied.

Referring to FIG. 1, a real-time service terminal 110 receives a real-time service through a router 140, a connection switch 130, and a switch 120 via a backbone network from a real-time broadcasting server 170. The router 140, the connection switch 130, and the switch 120, which are Ethernet switches, transmit a monitoring result of the real-time service to a real-time monitoring server 150.

The real-time monitoring server 150 collects the monitoring results to transmit to a Quality of Service (QoS) control server 160. Then, the QoS control server 160 controls the real-time service from the real-time broadcasting server 170 for each flow, based on the transmitted monitoring result.

In accordance with the embodiment of the present invention, the router 140, the connection switch 130, and the switch 120, which are Ethernet switches, measure a network parameter using a time stamp in real time, in order to monitor the state of a network service for the real-time service in real time. The network parameter may include an inter-packet jitter, a packet loss, and packet latency in equipment.

When a problem occurs in the real-time service due to a problem on the network, the real-time monitoring server 150 and the QoS control server 160 may analyze the feature of the real-time service to control the priority of each flow. Furthermore, the real-time monitoring server 150 and the QoS control server 160 monitor an equipment in which a problem occurred on the service path and the occurrence cause of the problem in real time, making it possible to stably operate the real-time service.

Therefore, the Ethernet switches 120 to 140 may measure important parameters having an effect upon the real-time service in real time. The parameters may include a packet loss in equipment, an inter-packet jitter, latency in equipment, propagation delay, the sequence number of Real-time Transport (RTP) protocol and so on. When a problem occurs in the real-time service due to a problem on the network, the real-time monitoring server 150 and the QoS control server 160, which are real-time monitoring platforms, perform immediate monitoring to accurately analyze the cause of the trouble.

Meanwhile, the real-time service terminal 110 may check that a problem occurred in the real-time service, and grasp whether the trouble is based on the terminal or the network. Then, the real-time service terminal 10 informs the platforms that the problem occurred in the real-time service. At this time, the real-time service terminal 110 informs the platforms of the profile of the real-time service for the occurring problem, that is, a Media Access Control (MAC) address, an IP address, Transmission Control Protocol (TCP)/User Datagram Protocol (UDP) port numbers and so on. The real time monitoring server 150 which is a real-time service monitoring platform instructs equipments, through which the corresponding flow passes, to monitor the state of the flow based on the profile of the real-time service.

Each of the switches 120 to 140 extracts a recent monitoring result of network parameters such as packet loss, jitter, latency, and bandwidth for the corresponding flow, and transmits the extracted result to the real-time monitoring server 150. Furthermore, the switch continuously register the corresponding flow into a Filtering Database (FDB), a look-up table, or an Access Control List (ACL) to perform real-time monitoring, and periodically transmits the monitoring result to the real-time monitoring server 150.

In particular, when a network parameter exceeding a threshold value which may have an effect upon the real-time service occurs, each of the switches 120 to 140 immediately transmits the monitoring result of the corresponding flow to the real-time monitoring server 150. The QoS control server 160 increases the priority of the flow passing through the corresponding equipment to a higher priority, if necessary, such that the parameters having an effect upon the service do not exceed the threshold value.

The real-time monitoring and control of the network service may provide a real-time service with a more excellent quality.

Figure 2:
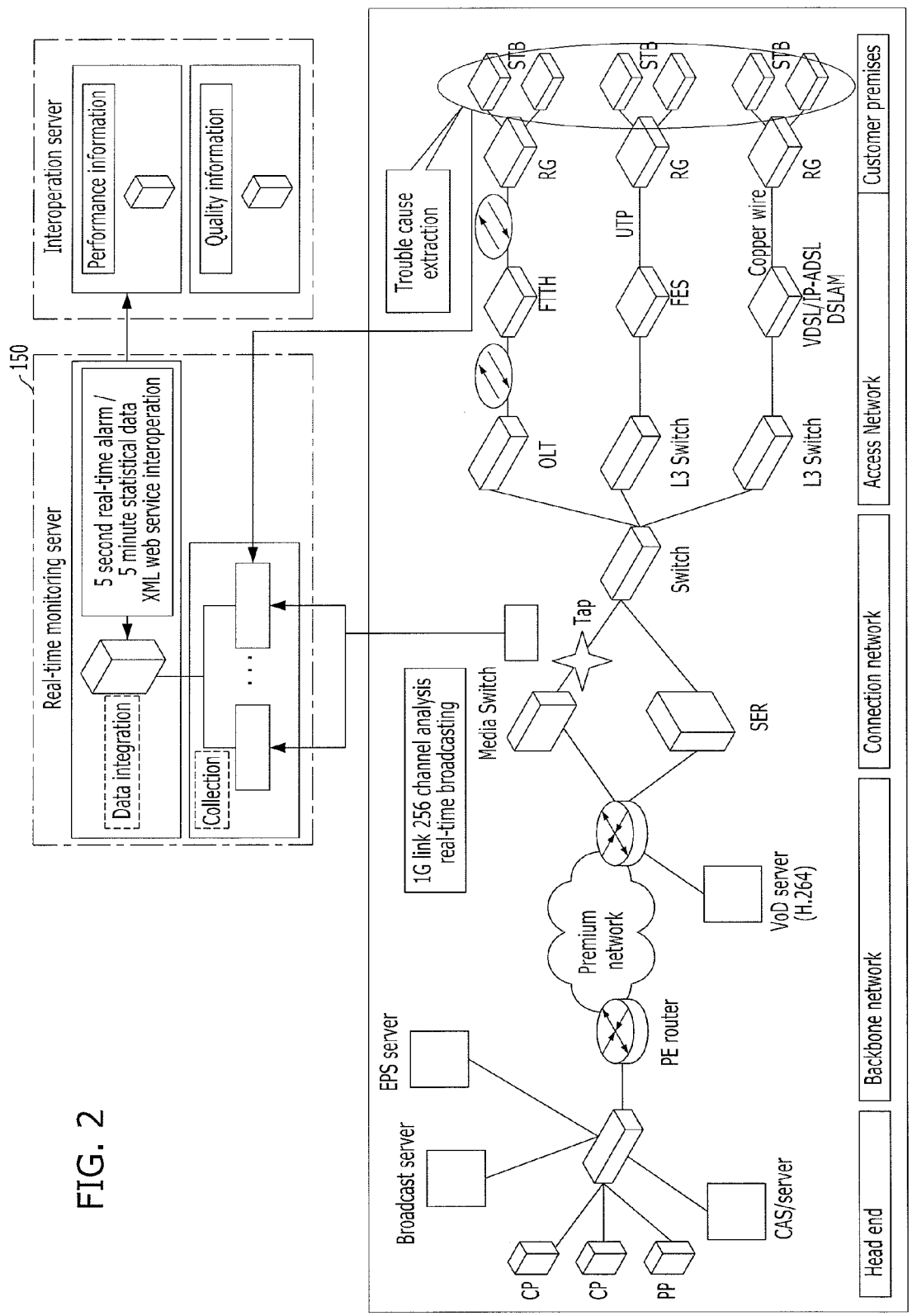
FIG. 2 is a detailed configuration diagram of a conventional real-time service monitoring network.

FIG. 2 is a detailed configuration diagram of a conventional real-time service monitoring network.

Referring to FIG. 2, a broadcast server is connected to a media switch through a premium network via a Provider Edge (PE) router in the conventional real-time service monitoring network. The media switch is connected to a STB of a real-time service terminal 110 through an L3 switch, a Fast Ethernet Switch (FES), and a Residential Gateway (RG), through an Optical Line Terminal (OLT), Fiber To The Home (FTTH), and an RG, or through an L3 switch, Very high-data rate Digital Subscriber Line (VDSL)/IP Asymmetric Digital Subscriber Line (ADSL) Digital Subscriber Line Access Multiplexer (DSLAM), and an RG via a switch.

In the conventional real-time service monitoring network, the broadcast server measures an image quality (transmission quality) at a head end stage, and sampling is performed to measure a quality (backbone network transmission quality) at an edge stage. The real-time service terminal 110 measures a quality in a customer premise. The real-time service terminal 110 samples and analyzes whether the real-time service is smoothly transmitted to a subscriber network or not, or checks the state of the real-time service in the STB of the real-time service terminal 110.

In the conventional real-time service monitoring network, it is impossible to find a network equipment (node) in which a problem occurs. Furthermore, it is impossible to check which problem is occurring in the network, which means that the management of the real-time service network is not performed substantially.

Figure 3:
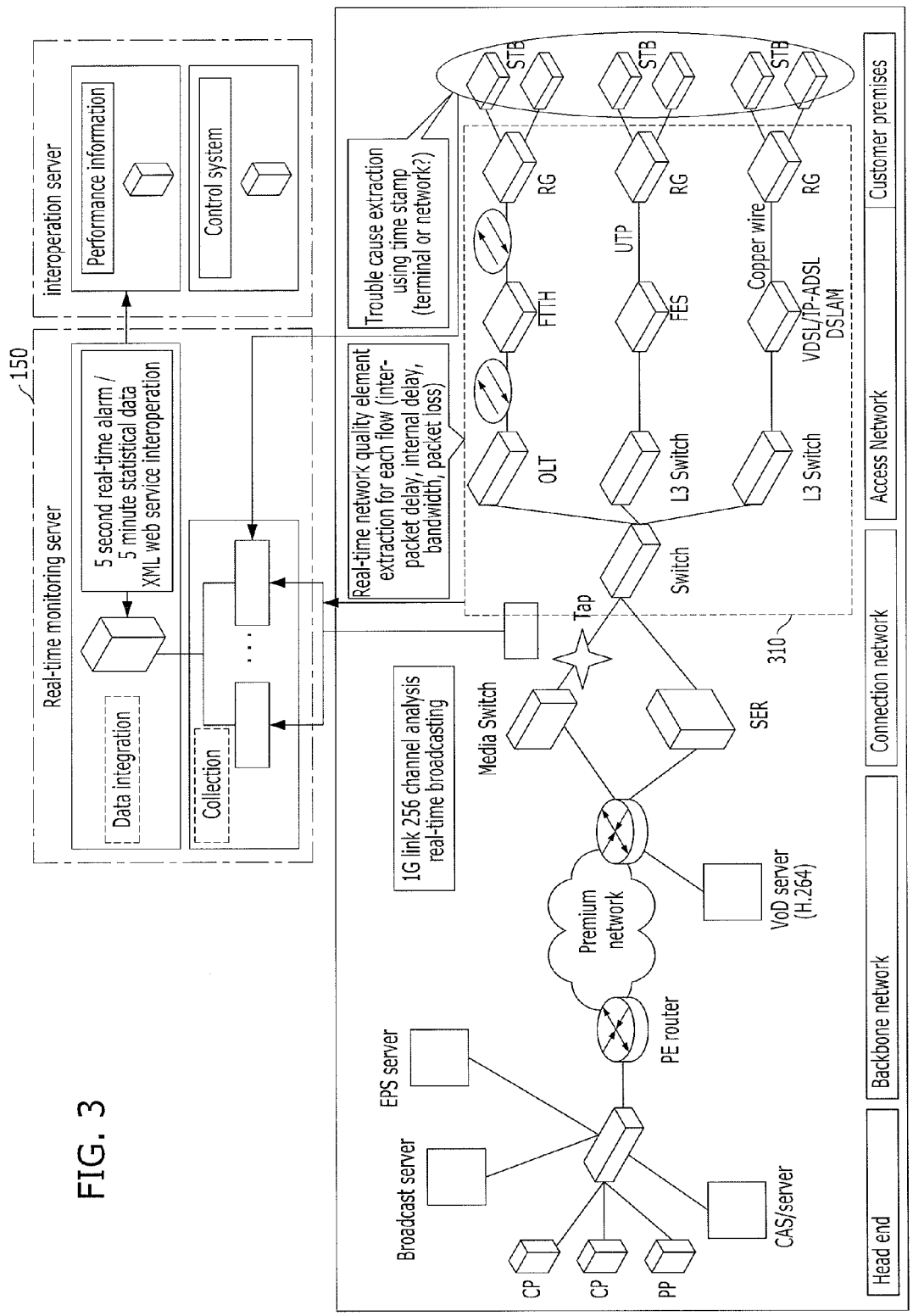
FIG. 3 is a detailed configuration diagram of the real-time service monitoring network of FIG. 1 in accordance with the embodiments of the present invention.

FIG. 3 is a detailed configuration diagram of the real-time service monitoring network of FIG. 1 in accordance with the embodiments of the present invention.

Referring to FIG. 3, quality measurement may be performed in real time at a network node in the real-time service monitoring network. Each of the switches 310 measures a packet loss for each service flow, latency in equipment, a packet arrival time variation (Inter-Arrival Time (IAT) variation), and the sequence number of an RTP stream in real time. Furthermore, when a monitoring value exceeding a preset threshold value occurs, the switch 310 stores a time stamp and the monitoring value. Then, the switch 310 measures a packet loss, an inter-packet jitter, and latency in equipment in real time in accordance with the real-time network monitoring technology to find a network node in which the problem occurred, and transmits the measurement result to the real-time monitoring server 150 such that control can be performed for each flow.

Each of the switches 310 in accordance with the embodiments of the present invention is a network equipment capable of monitoring, analyzing, and controlling the real-time service in real time in an Ethernet transmission system. Furthermore, the switch 310 monitors a network factor having an effect upon the quality of the real-time service for each flow at normal times, and analyzes the network factor in real time. When analysis information exceeding a threshold value at which an abnormality may occur in the service quality occurs, the switch 310 informs the real-time monitoring server 150 of the analysis information, and leaves a log of the abnormal state.

In this case, the parameter for monitoring the service quality may include the packet length of each flow, an inter-packet jitter for analyzing whether or not delay has occurred in the previous network equipment, packet latency in equipment, a packet loss in equipment, and the sequence number of an RTP protocol for analyzing whether or not a packet loss has occurred in the previous network equipment. Each of the switches 310, which are Ethernet switches, directly measures such network parameters in real time, and estimates the quality based on the parameters.

When the real-time service terminal 110 informs the platform of an abnormality in the service quality, all the switches 310 through which a flow corresponding to the service passes check the monitoring state of the flow to find the corresponding network equipment in which the problem occurred. When informed that a packet was delayed or a packet loss occurred due to a congestion state of packets in the same queue which is caused by the same priority, the QoS server 150 increases the priority of the corresponding flow in all the switches 310, if necessary, such that the flow may be transmitted smoothly.

Figure 4:
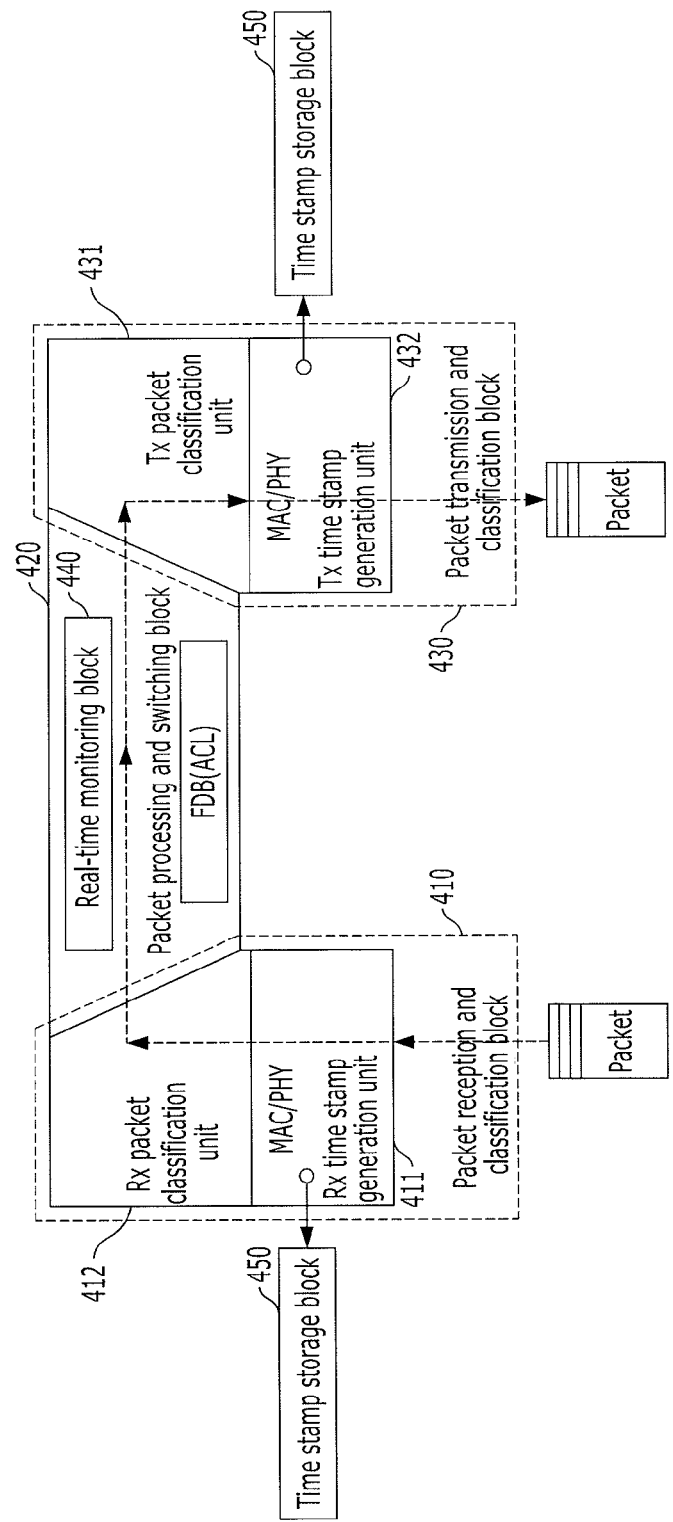
FIG. 4 is a configuration diagram of a real-time service monitoring apparatus using a time stamp in accordance with an embodiment of the present invention.
Figure 5:
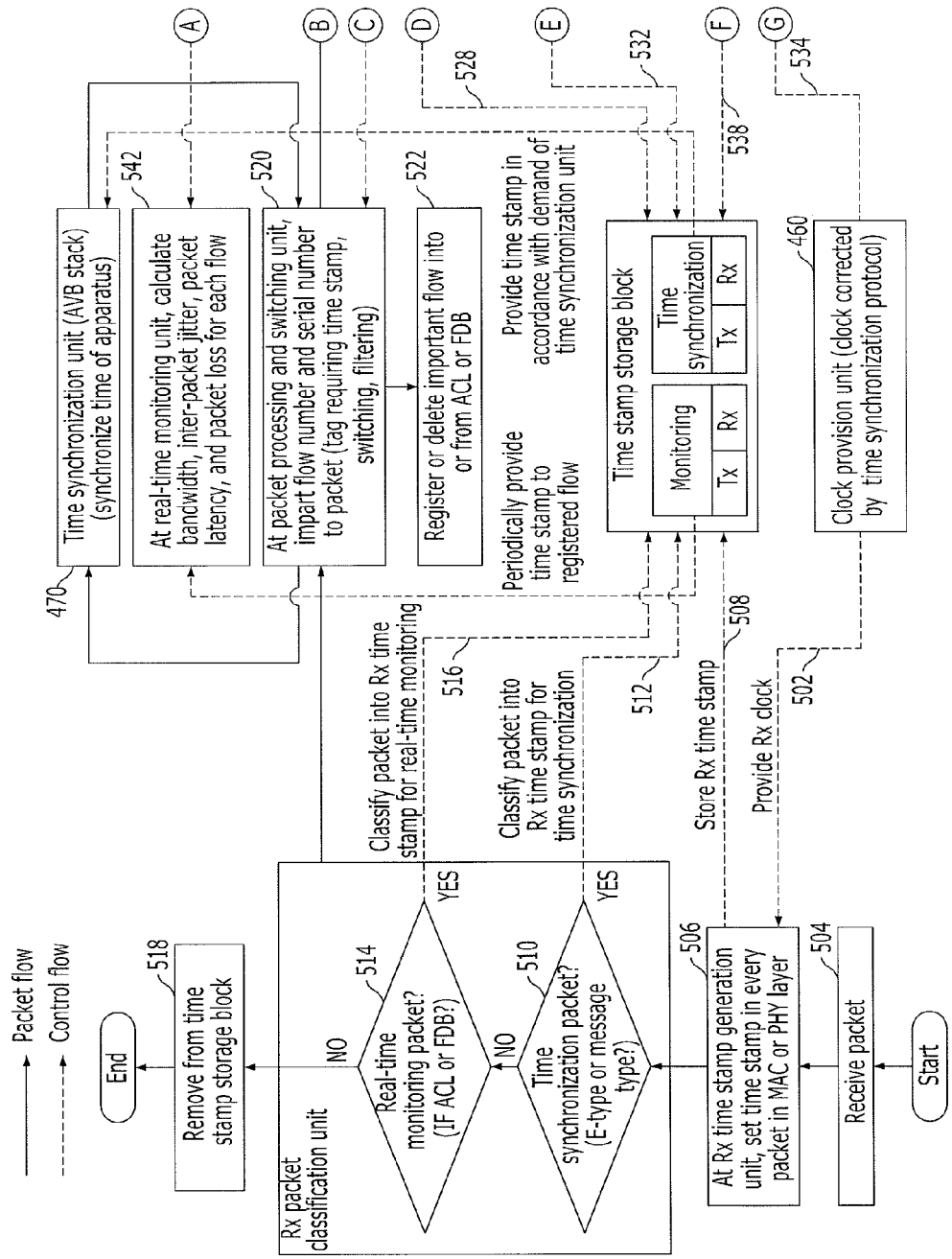
FIGS. 5 and 6 are a flowchart of a real-time service monitoring method using a time stamp in accordance with another embodiment of the present invention.
Figure 6:
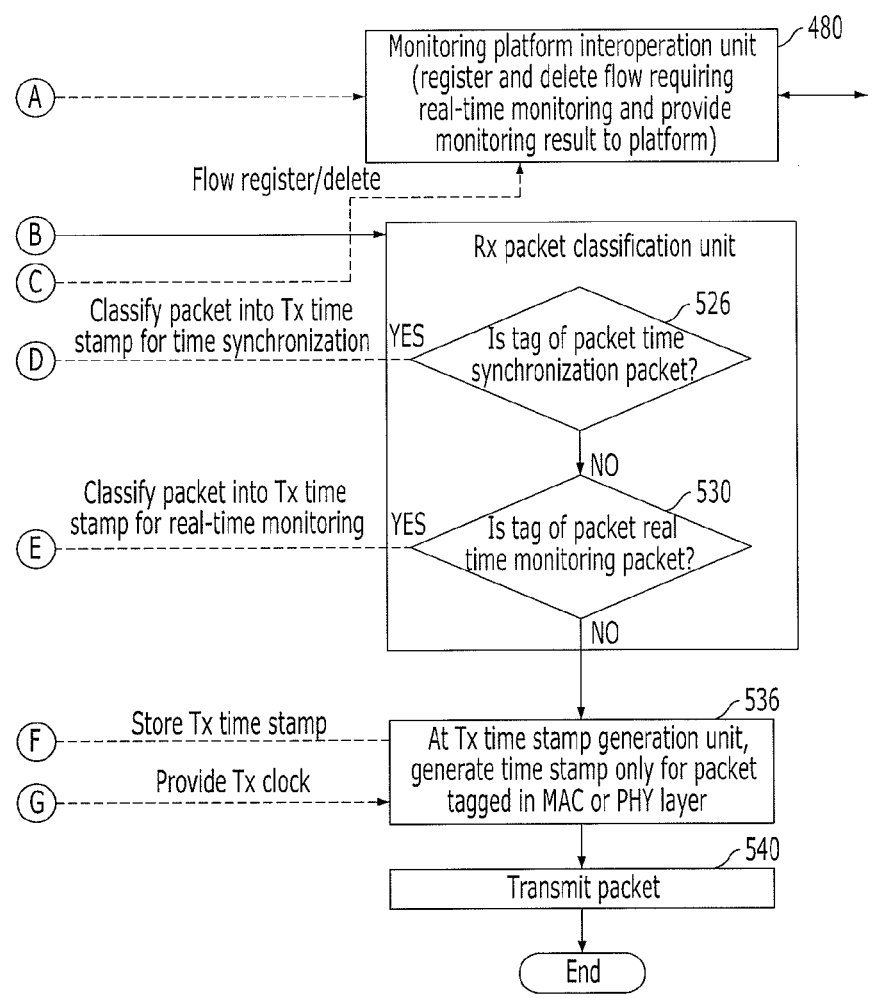

FIG. 4 is a configuration diagram of a real-time service monitoring apparatus using a time stamp in accordance with an embodiment of the present invention. FIGS. 5 and 6 are a flowchart of a real-time service monitoring method using a time stamp in accordance with another embodiment of the present invention.

Referring to FIGS. 4 to 6, the real-time service monitoring apparatus in accordance with the embodiment of the present invention includes a packet reception and classification block 410, a packet processing and switching block 420, a packet transmission and classification block 430, a real-time monitoring block 440, a time stamp storage block 450, a clock provision block 460, a time synchronization block 470, and a monitoring platform interoperation block 480. The packet reception and classification block 410 includes a received (Rx) time stamp generation unit 411 and an Rx packet classification unit 412. The packet transmission and classification block 430 includes a transmitted (Tx) packet classification unit 431 and a Tx time stamp generation unit 432.

Hereafter, the respective blocks of the real-time service monitoring apparatus in accordance with the embodiment of the present invention will be described as follows.

The packet reception and classification block 410 generates an Rx time stamp whenever receiving a packet, and classifies the received packet into a real-time monitoring packet or time-synchronization packet.

The packet processing and switching block 420 processes the classified packet depending on whether the packet is a time synchronization packet or a real-time monitoring packet, and switches the processed packet to a destination address.

The packet transmission and classification block 430 classifies the switched packet depending on whether the packet is a time synchronization packet or a real-time monitoring packet, and generates and transmits a Tx time stamp for the classified packet.

The real-time monitoring block 440 computes a real-time monitoring parameter for each flow using the generated Rx and Tx time stamps.

The packet reception and classification block 410 will be described in more detail as follows. The Rx time stamp generation unit 411 generates a time stamp whenever a packet is received, in order for real-time monitoring.

The time stamp storage block 450 stores the Rx time stamp generated by the Rx time stamp generation unit 411.

The Rx packet classification block 412 classifies the packet through a registered flow or packet head and determines whether or not the packet is a packet corresponding to the flow registered for time synchronization or real-time monitoring.

The packet processing and switching block 420 changes the head of the packet and generates a series of flows based on the address and element of the packet head. Furthermore, the packet processing and switching block 420 imparts a unique flow identification number to each flow, and imparts a tag to discriminate whether or not a time stamp was required during the transmission. When a flow is recognized as an important flow even though the flow is not registered, the packet processing and switching block 420 registers the flow. Furthermore, the packet processing and switching block 420 switches the packet to a destination or filters the packet. In the case of a flow using the RTP protocol, the packet processing and switching block 420 checks the sequence number of the RTP protocol to determine whether a packet loss occurred or not.

The packet transmission and classification block 430 will be described in more detail as follows. The Tx packet classification unit 431 checks whether or not to provide a time stamp to a Tx packet. When a time stamp is provided to the Tx packet, the Tx packet classification unit 431 classifies the Tx packet by determining whether the packet is a time synchronization packet or a real-time monitoring packet. In this case, the Tx packet classification unit 431 determines whether the packet corresponds to the flow registered for real-time monitoring or not.

Then, the Tx time stamp generation unit 432 generates a Tx time stamp when the Tx packet escapes from the real-time service monitoring apparatus. The time stamp storage block 450 stores the generated Tx time stamp.

Meanwhile, when a packet is received and transmitted, the clock provision block 460 provides a clock of the time stamp to the Rx and Tx time stamp generation units 411 and 432. The clock provision block 460 may be synchronized by a time synchronization protocol of the time synchronization block 470.

The time stamp storage block 450 classifies the time stamps of the Rx and Tx packets into a time-synchronization time stamp and a real-time monitoring time stamp. Furthermore, the time stamp storage block 450 may classify the time stamps into an Rx time stamp and a Tx time stamp, and store the classified time stamps.

Meanwhile, in order to analyze the traffic of registered flows in real time, the real-time monitoring block 440 classifies the flows on the basis of the flow numbers thereof. The real-time monitoring block 440 compares the numbers of Rx and Tx packets for each of the classified flows to measure a packet loss. Furthermore, the real-time monitoring block 440 compares the time stamps of the Rx and Tx packets, and calculates a previous inter-packet jitter, latency in equipment, the lengths of the packets, an IAT, and a flow bandwidth in real time, using the Rx and Tx time stamps. Then, the real-time monitoring block 400 receives omitted sequence numbers of the RTP protocol from the packet processing and switching block 420.

The time synchronization block 470 may operate in accordance with a protocol for performing synchronization of the network, and synchronize the time of the clock provision block 460.

The monitoring platform interoperation block 480 provides the real-time monitoring result of each equipment to the real-time monitoring platform. That is, the monitoring platform interoperation block 480 stores a result obtained by analyzing the state of a specific flow in real time, and interoperates with the monitoring platform to provide the result to the platform.

In other words, the real-time service monitoring apparatus in accordance with the embodiment of the present invention is an Ethernet switch for monitoring and controlling a real-time service in real time. The respective components thereof will be described in more detail as follows.

The Rx time stamp generation unit 411 generates a time stamp for an Rx packet.

The Rx packet classification unit 412 classifies the packet through a registered flow or packet head, and determines whether the packet is a packet corresponding to a flow registered for time synchronization or a flow for real-time monitoring.

The packet processing and switching block 420 changes the head of the packet and generates a series of flows based on the address and element of the packet head. Then, the packet processing and switching block 420 imparts a unique flow identification number to each flow. To discriminate whether or not a time stamp is required during the transmission, the packet processing and switching block 420 imparts a tag. When a flow is recognized as an important flow even though the flow is not registered currently, the packet processing and switching block 420 registers the flow, and switches the packet to a destination or performs filtering.

The Tx packet classification unit 431 checks whether or not to provide a time stamp to a Tx packet. When a time stamp is provided, the Tx packet classification unit 431 classifies the Tx packet by determining whether the Tx packet is a time synchronization packet or a real-time monitoring packet.

The Tx time stamp generation unit 432 generates a time stamp when the Tx packet escapes from the real-time service monitoring apparatus.

Meanwhile, the clock provision block 460 provides a clock of the time stamp during reception and transmission, and may be synchronized by the time synchronization protocol of the time synchronization block 470.

The time stamp storage block 450 classifies the time stamps of Rx and Tx packets into a time-synchronization time stamp and a real-time monitoring time stamp. Furthermore, the time stamp storage block 450 may classify the time stamps into an Rx time stamp and a Tx time stamp, and store the classified time stamps.

In order to analyze the traffic of registered flows in real time, the real-time monitoring block 440 classifies the flows on the basis of the flow numbers thereof. The monitoring platform interoperation block 480 compares the numbers of Rx and Tx packets for each of the classified flows to measure a packet loss. Furthermore, the monitoring platform interoperation block 480 compares the time stamps of the Rx and Tx packets, and then measures a previous inter-packet jitter, latency in equipment, the lengths of the packets, an IAT, and a bandwidth in real time, using the Rx time stamp.

The time synchronization block 470 may operate in accordance with a protocol for performing the synchronization of the network, and synchronize the time of the clock provision unit 460.

The monitoring platform interoperation block 480 stores a result obtained by analyzing the state of a specific flow in real time, and interoperates with the monitoring platform to provide the result to the platform.

Meanwhile, packets transmitted from the real-time broadcasting server 170 form one flow. The flow indicates a continuous flow of packets having the same IP source and destination addresses, the same TCP/UDP port number, and the same protocol type. For example, one moving picture which is multicast or streamed forms one flow.

Such a service as IPTV or video phone is transmitted at a constant bandwidth in real time. The flow transmitted at a constant bandwidth has an inter-packet jitter which is an interval between packets. The series of transmitted packets may be lost or delayed by congestion while passing through the network. In this case, the quality of the real-time service may be degraded.

The real-time service monitoring apparatus in accordance with the embodiment of the present invention measures such a network element as the inter-packet jitter or the packet loss in real time such that the quality of the real-time service may be monitored or controlled in real time.

When a broadcast service is watched in real time through the real-time service terminal 110, packets pass through a plurality of network equipments with an Ethernet switch set to a transmission interface.

The packets transmitted to such a network equipment having an Ethernet interface are processed through a process shown in FIGS. 5 and 6. Referring to FIGS. 5 and 6, the real-time service monitoring method in accordance with the embodiment of the present invention will be described in detail as follows.

First, the clock provision block 460 provides an Rx clock to the Rx time stamp generation unit 411, and the real-time service monitoring apparatus receives a packet at a step S504.

The Rx time stamp generation unit 411 sets a time stamp to every packet in accordance with the accurate time at which the packet is received into a MAC layer or a physical (PHY) layer, at a step S506. In this case, the time stamp is set in accordance with a scheme defined by the Institute of Electrical and Electronics Engineers (IEEE) 1588 or 802.1AS standard. Furthermore, the reception time of the corresponding packet is previously provided from the clock provision block 460.

The time stamp storage block 450 temporarily stores the value of the time stamp corresponding to the received packet and a pointer representing the value at a step S508.

The Rx packet classification unit 412 includes a time synchronization classifier and a real-time monitoring classifier, and classifies the packet to determine whether the packet is a time synchronization packet or a real-time monitoring packet. That is, the time synchronization classifier checks whether the packet is a time synchronization packet or not, depending on the Ethertype (Etype) and message type of an Ethernet header defined by the IEEE 1588 or IEEE 802.1AS, at a step S510.

As the check result of the step S510, when the Rx packet is a time synchronization packet, the time synchronization classifier controls the time stamp storage block 450 to classify the time stamp of the corresponding Rx packet into an Rx time stamp for time synchronization, at a step S512.

On the other hand, when the Rx packet is not a time synchronization packet, the real-time monitoring classifier checks whether the packet is a real-time monitoring packet or not, depending on whether or not the packet matches an ACL or FDB which is defined and registered, at a step S514.

As the check result of the step S514, when the Rx packet is not a real-time monitoring packet, the real-time monitoring classifier controls the time stamp storage block 450 to delete the time stamp of the Rx packet at a step S518.

On the other hand, when the Rx packet is a real-time monitoring packet, the real-time monitoring classifier transfers the real-time monitoring packet to the packet processing and switching block 420.

The packet processing and switching block 420 processes the classified packet depending on whether the packet is a time synchronization packet or a real-time monitoring packet, at a step S520. That is, the packet processing and switching block 420 registers or deletes a flow list into or from the Rx packet classification unit 412, if necessary. The definition of the flow registered or deleted in such a manner may be collectively imparted to or deleted from Ethernet equipments through the real-time monitoring server 150.

In particular, although defined as a flow, packets having a high priority of QoS, such as a priority field or Terms of Service (ToS) field of the IEEE 802.1Q, are classified into a flow by the packet processing and switching block 420, and the flow is registered at a step S522.

For the time stamp classified into the time synchronization packet, the packet processing and switching block 420 attaches a tag representing a time synchronization packet to the corresponding packet, and stores the time stamp in an Rx stamp storage area of the time stamp storage block 450.

The packet processing and switching block 420 inserts a tag representing a real-time monitoring packet into the packet classified into the real-time monitoring flow, and then attaches the unique number of the flow and the serial number of the packet. Then, the packet processing and switching block 420 attaches the number of the flow and the serial number of the packet to the corresponding time stamp and stores the time stamp in the RX time stamp storage area of the time stamp storage block 450.

The packet processing and switching block 420 analyzes the heads of packets having a high QoS priority and additionally registers the flow into the ACL or FDB to perform the real-time monitoring at a step S522.

The time synchronization packet is transmitted to the time synchronization block 470. The time synchronization block 470 analyzes the message of the packet to calculate an accurate time, and adjusts the time of the clock provision block 460 to perform synchronization with the network. In this case, when a clock which is not synchronized with the network is applied, the accuracy may decrease a little. However, the accuracy is sufficient to perform the real-time monitoring.

In the case of a flow using the RTP protocol among flows required for real-time monitoring, the packet processing and switching block 420 checks RTP sequence numbers. When some of RTP sequence numbers are omitted, the packet processing and switching block 420 transfers the number of omitted packets to the real-time monitoring block 440.

The packet processing and switching block 420 switches the packet classified into the flow required for real-time monitoring and the time synchronization packet transferred from the time synchronization block 470 to a destination port of the corresponding packets.

The Tx packet classification unit 431 includes a time synchronization classifier and a real-time monitoring classifier which classify the packet transmitted to a transmission port into the time synchronization packet or the real-time monitoring packet by referring to the tag of the packet.

That is, the time synchronization classifier of the Tx packet classification unit 431 checks whether the tag of the packet represents a time synchronization packet or not at a step S526.

As the check result of the step S526, when the tag of the packet represents a time synchronization packet, the Rx packet classification unit 431 classifies the time stamp of the packet into a Tx time stamp for time synchronization, and stores the Tx time stamp in a time synchronization storage area of the time stamp storage block 450 at a step of S528.

On the other hand, when the tag of the packet does not represent a time synchronization packet, the real-time monitoring classifier checks whether the tag of the packet represents a real-time monitoring packet or not, at a step S530.

As the check result of the step S530, when the tag of the packet represents a real-time monitoring packet, the real-time monitoring classifier classifies the time stamp of the packet into a Tx time stamp for real-time monitoring.

Meanwhile, the clock provision block 460 provides a Tx clock to the Tx time stamp generation unit 432 through a time synchronization protocol at a step S534.

As the check result of the step S530, when the tag of the packet does not represent a real-time monitoring packet, the Tx time stamp generation unit 432 generates a time stamp by referring to the time stamp tag of the Tx packet at a step S536. For example, the Tx time stamp generation unit 432 generates a time stamp only for a packet tagged in the MAC or PHY layer.

The real-time monitoring classifier stores the time stamp of the time synchronization packet in a Tx time stamp storage area at a step S538, the time synchronization packet being generated from the Tx time stamp generation unit 432. When the time synchronization time stamp stored in the time stamp storage block 450 requires a protocol stack of the time synchronization block 470, the memory is accessed to acquire the time stamp. The packet transmission and classification block 430 transmits the packet.

The time stamp storage block 450 periodically provides the stored real-time monitoring time stamp to the real-time monitoring unit 532. The time synchronization block 470 performs the synchronization with the network on the basis of the received protocol message, and transfers the synchronization time to the clock provision block 460 to synchronize the time.

The real-time monitoring block 440 periodically receive the Tx and Rx time stamps, and calculates an inter-packet jitter for each flow, packet latency in equipment, a packet loss, a bandwidth for each flow, and omitted RTP sequence numbers at a step S542.

The real-time monitoring block 440 averages the Rx time stamps of a plurality of packets to calculate the inter-packet jitter in real time. To reduce a variation caused by instantaneous packet delay, the Rx time stamps of the plurality of packets are averaged. At this time, the real-time monitoring block 440 consecutively includes the first and last packets in the following calculation, in order to secure the continuity between the averages. The average inter-packet jitter may be expressed as Equation 1 below.

$$\text{Average Inter-Packet Jitter} = (\Sigma_{i=1}^{n}(TS\_Rx\_i - TS\_Rx\_{i-1}))/n \quad \text{Eq. 1}$$

where TS_Rx_i represents the time stamp of an i-th Rx packet, TS_Rx_i−1 represents the time stamp of an (i−1)-th Rx packet, and n represents the number of packets used for calculating the average.

The real-time monitoring block 440 stores the maximum inter-packet jitter, the time stamp corresponding to the maximum inter-packet jitter, the average inter-packet jitter, and the time stamp corresponding to the intermediate packet of the average inter-packet jitter.

The real-time monitoring block 440 calculates a difference between Tx and Rx time stamps, and stores the packet latency in equipment which is equal to or more than a threshold value having an effect upon the service, the time stamp corresponding to the packet latency, the average packet latency, and the time stamp corresponding to the intermediate packet of the average packet latency.

$$\text{Packet Latency in Equipment} = (\Sigma_{i=1}^{n}(TS\_Tx\_i - TS\_Rx\_i))/n \quad \text{Eq. 2}$$

where TS_Tx_i represents the Tx time stamp of an i-th Tx packet, TS_Rx_i represents the Rx time stamp of an i-th Rx packet, and n represents the number of packets used for calculating the average.

When a Tx time stamp is present but an Rx time stamp of the corresponding packet is not present, the real-time monitoring block 440 considers this to be a packet loss. The real-time monitoring block 440 accumulates a packet loss for each flow, and stores a time stamp at which the packet loss occurs.

The real-time monitoring block 440 calculates a bandwidth for each flow through the Rx time stamp and length of the flow as expressed by Equation 3 below.

$$\text{Bandwidth for each flow} = (\text{Packet length} + IFG + \text{Preamble})/\text{Average Inter-Packet Jitter} \quad \text{Eq. 3}$$

The real-time monitoring block 440 stores the bandwidth for each flow and the time stamp of the intermediate packet.

The information on the bandwidth for each flow may be used in a QoS policy to determine whether another flow can be transmitted or not. Through the information, the sum of bandwidths of the registered flows may be maintained so as not to exceed a threshold value capable of guaranteeing the QoS.

For example, when the sum of bandwidths of the registered flows corresponds to a state just prior to the congestion, packets which are not registered and have the same priority of QoS value are received. Furthermore, when the bandwidth of the flow is processed at a high priority like a registered flow, it is predicted that the congestion will occur.

In this case, the real-time monitoring block 440 forcibly decreases the priority of the flow, and reduces the bandwidth of the flow. The monitoring platform interoperation block 480 informs the QoS control server 160 that the flow cannot processed smoothly. When the real-time monitoring block 440 controls whether or not to accept a certain important service, the real-time monitoring block 440 receives the sum of current important flows from the equipments on the traffic path. Furthermore, the QoS control server may reject or approve the service acceptance.

The real-time monitoring block 440 may predict a state in which the service is influenced, based on the values measured in the above-described manner. For example, the inter-packet jitter becomes a reference value informing that packets were non-uniformly transmitted or lost. The packet latency and the packet loss having a direct effect upon the service are clearly managed. When the packet latency is high or the packet loss occurs due to the congestion, the real-time monitoring block 440 may increase the transmission priority or inform the real-time monitoring server 150 of the state, and may receive a new QoS policy from the QoS control server 160.

The monitoring platform interoperation block 480 may provide the real-time monitoring values, which are measured, calculated, and stored by the real-time monitoring block 440, to the real-time monitoring server 150 and the QoS control server 160, depending on the necessity or demand. Furthermore, the monitoring interoperation block 480 may receive the QoS policy in real time to smoothly handle the service in which the problem occurs.

When informed of a service abnormality by the real-time service terminal 110, the real-time monitoring server 150 inquires the real-time monitoring results from the equipments on the path, based on the source and destination IP addresses, the TCP/UDP ports, the protocol type, and so on. Then, the real-time monitoring server 150 finds the equipment in which the problem occurred, based on the inter-packet jitter, the packet loss, or the packet latency which exceeds the threshold value.

The real-time monitoring server 150 informs a network administrator and a user that the problem occurred in the real-time service, through a service terminal or mobile phone. Alternatively, the real-time monitoring server 150 periodically receives the monitoring results of the real-time service from the Ethernet switches, and manages the service before informed of a problem by a terminal or user.

The real-time monitoring server 150 provides the IP address of the equipment in which the problem occurred to the QoS control server 160. The QoS control server 160 checks whether the equipment is in a congestion state or not, based on the real-time monitoring result of the corresponding equipment. When a packet loss or an inter-packet jitter occurred due to the congestion state, the QoS control server 160 increases the priority of the flow in which the problem occurred.

The real-time service monitoring method in accordance with the embodiment of the present invention is a technology capable of monitoring a real-time service in a state in which the real-time service is being provided. That is, each of the switches 120 to 140 measures the IAT, the packet loss, and the packet latency of a specific service flow in real time, in order to monitor the state of the real-time service. When the RTP technology is used, the switch looks up the sequence numbers of streams, and analyzes whether a packet loss occurs at the previous node or not, for each service (flow).

Furthermore, each of the switches 120 to 140 measures whether or not a jitter or loss occurred in the previous node of the network, through the IAT and the RTP sequence number. Furthermore, the switch measures whether packets are lost in the switch or not, through the packet loss, and measures how much latency occurred in the switch, through the packet latency.

When the measured service quality element exceeds a specific limit, each of the switches 120 to 140 informs the real-time monitoring server 150 of the state. When a problem continuously occurs or a quality abnormality is informed by a customer, the real-time monitoring server 150 and the QoS control server 160 may trace the equipment in which the problem occurred, and change the QoS policy of the corresponding flow.

The real-time service monitoring apparatus and method in accordance with the embodiments of the present invention analyzes the trouble cause of the real-time service on the basis of the quality analysis of the real-time service at each equipment, in order to secure the quality stability of the real-time service. Furthermore, the real-time service monitoring apparatus and method collects and analyzes the real-time monitoring analysis results transmitted from the remote equipments in remote places to accurately trace the trouble cause and position of the network equipment or path in which the trouble occurred. Furthermore, the real-time service monitoring apparatus and method may solve the service trouble in real time through the QoS control or the like, or notice the trouble cause of the equipment such that the trouble can be quickly handled.

The real-time service monitoring apparatus and method in accordance with the embodiments of the present invention analyzes the problem having an effect upon the real-time service and reflects the analysis result into the network design, in order to stably provide the real-time service. For example, the real-time service monitoring apparatus and method may implement the real-time monitoring of the real-time service through the real-time analysis of service trouble, the trouble cause trace, and the equipment/path trace, and secure the stability of the real-time service through the network control.

The real-time service monitoring apparatus and method in accordance with the embodiments of the present invention may solve the service trouble in real time through the QoS control for the equipment in which the trouble occurred, thereby increasing the service quality. Furthermore, the real-time service monitoring apparatus and method may analyze the problem having an effect upon the real-time service and reflect the analysis result into the network design, thereby stably providing the real-time service. Furthermore, the real-time service monitoring apparatus and method may secure the stability of the real-time service through the network controls such as the real-time analysis of the service trouble, the trouble cause trace, and the equipment/path trace, thereby increasing the service quality.

The real-time service monitoring apparatus in accordance with the embodiment of the present invention may be implemented by adding a function to the conventional apparatus. Therefore, it is possible to monitor the real-time service on the entire service path at almost the same cost as in the conventional apparatus. That is, in the conventional real-time service monitoring apparatus, a large cost is required for measuring the real-time service at a specific port of the edge-stage equipment, and the service cannot be measured at the rear stage of the equipment. However, the real-time service monitoring apparatus and method in accordance with the embodiments of the present invention directly monitors users' complaints for a service trouble and solves the service trouble through the remote control, which makes it possible to reduce the man power and cost.

The invention can also be embodied as computer programs. Codes and segments constituting the computer programs can be easily construed by programmers skilled in the art to which the invention pertains. Furthermore, the invention is implemented by storing the computer programs in a computer-readable recording medium (information storage medium) and reading and executing them by a computer. The recording medium includes any type of computer-readable recording media.

While the present invention has been described with respect to the specific embodiments, it will be apparent to those skilled in the art that various changes and modifications may be made without departing from the spirit and scope of the invention as defined in the following claims.

What is claimed is:

1. A real-time service monitoring apparatus, comprising:
 a packet reception and classification block configured to generate a first time stamp whenever receiving a packet, the packet transmitted from a source to a destination, and classify the received packet into a time synchronization packet or a real-time monitoring packet;
 a packet processing and switching block configured to process the classified packet into a flow depending on whether the packet is the time synchronization packet or the real-time monitoring packet, register the flow in a real-time monitoring database of the real-time service monitoring apparatus, and switch the processed packet to the destination;
 a packet classification and transmission block configured to classify the switched packet depending on whether the packet belongs to the registered flow, generate a second time stamp for the classified packet that belongs to the registered flow, and transmit the packet to the destination; and
 a real-time monitoring block configured to compute a real-time monitoring parameter for each registered flow of a real-time service using the generated first and second time stamps, the real-time monitoring parameter computed by using the generated first and second time stamps within the real-time service monitoring apparatus in real time, and transmit a real-time monitoring result of monitoring the real-time monitoring parameter to a quality of service monitoring server configured to monitor quality of service of the real-time service through the real-time service monitoring apparatus, wherein a priority of each flow is controlled according to the real-time monitoring result.

2. The real-time service monitoring apparatus of claim 1, further comprising:

a time stamp storage block configured to classify the generated time stamps of the packet into a time-synchronization time stamp, a real-time monitoring time stamp, and time stamps of transmitted (Tx) and received (Rx) packets, and store the classified time stamps;

a time synchronization block configured to synchronize a time of the real-time service monitoring apparatus using the stored time-synchronization time stamp; and a monitoring platform interoperation block configured to transmit the real-time monitoring result generated by the real-time monitoring block to the quality of service monitoring server.

3. The real-time service monitoring apparatus of claim 2, wherein the real-time monitoring block computes any one of a packet loss in equipment, an inter-packet jitter, packet latency in equipment, propagation delay, sequence number, and a bandwidth for the each flow using the stored real-time monitoring time stamps of the Rx and Tx packets, in order to perform a real-time monitoring of the quality of service of the real-time service through the real-time service monitoring apparatus.

4. The real-time service monitoring apparatus of claim 3, wherein the real-time monitoring block immediately transmits the real-time monitoring result to the real-time quality of service monitoring server through the monitoring platform interoperation block, when the real-time monitoring parameter exceeds a threshold value.

5. The real-time service monitoring apparatus of claim 4, wherein the packet processing and switching block generates each flow from the classified packets, imparts a unique identification number to the each flow, and inserts a tag into the packet classified into the registered flow.

6. The real-time service monitoring apparatus of claim 5, wherein the packet reception and classification block comprises:

an Rx time stamp generation unit configured to generate the first time stamp whenever a packet is received; and an Rx packet classification unit configured to classify the received packet for each flow registered for time synchronization or the real-time monitoring.

7. The real-time service monitoring apparatus of claim 5, wherein the packet transmission and classification block comprises:

a Tx packet classification unit configured to classify the switched Tx packet using the tag of the Tx packet, depending on whether the time-synchronization time stamp or the real-time monitoring time stamp is provided; and an Rx time stamp generation unit configured to generate the time-synchronization time stamp or the real-time monitoring time stamp depending on the classified Tx packet.

8. The real-time service monitoring apparatus of claim 1, wherein the real-time service monitoring apparatus is a router or a switch.

9. The real-time service monitoring apparatus of claim 1, wherein the real-time monitoring block is further configured to compute the real-time monitoring parameter for each registered flow of a real-time service, and generate the real-time monitoring result based on the computed real-time monitoring parameter, and control the priority of each registered flow controlled based on the real-time monitoring result.

10. A real-time service monitoring method in a real-time service monitoring apparatus, comprising:

generating a first time stamp whenever receiving a packet, the packet transmitted from a source to a destination, and classifying the received packet into a time synchronization packet or a real-time monitoring packet;

processing the classified packet into a flow depending on whether the packet is the time synchronization packet or the real-time monitoring packet, registering the flow in a real-time monitoring database of the real-time service monitoring apparatus, and switching the processed packet to the destination;

classifying the switched packet depending on whether the packet belongs to the registered flow, generating a second time stamp for the classified packet that belongs to the registered flow, and transmitting the packet to the destination; and computing a real-time monitoring parameter for each registered flow of a real-time service using the generated first and second time stamps, the real-time monitoring parameter computed by using the generated first and second time stamps within the real-time service monitoring apparatus in real time in real time; and transmitting a real-time monitoring result of monitoring the real-time monitoring parameter to a quality of service monitoring server configured to monitor quality of service of the real-time service through the real-time service monitoring apparatus, wherein a priority of each flow is controlled according to the real-time monitoring result.

11. The real-time service monitoring method of claim 10, further comprising:

synchronizing a time of the real-time service monitoring method using the time stamp of the time synchronization packet; and transmitting the real-time monitoring result to the quality of service monitoring server.

12. The real-time service monitoring method of claim 11, wherein, in the computing the real-time monitoring parameter, real-time monitoring time stamps of transmitted (Rx) and transmitted (Tx) packets are used to compute any one of a packet loss in the method, an inter-packet jitter, packet latency in the method, propagation delay, sequence number, and a bandwidth for the each flow, in order to perform a real-time monitoring of the quality of service of the real-time service through the real-time service monitoring apparatus.

13. The real-time service monitoring method of claim 12, wherein, in the computing the real-time monitoring parameter, when a the real-time monitoring parameter is equal to or more than a threshold value, the real-tune monitoring result is immediately transmitted to the real-time quality of service monitoring server.

14. The real-time service monitoring method of claim 13, wherein, in the processing the classified packet and the switching the processed packet, flows are generated from the classified packets, a unique flow identification number is imparted to each flow, and a tag is inserted into the packet classified into the registered flow.

15. The real-time service monitoring method of claim 13, wherein the generating the first time stamp and classifying the received packet comprises:
generating the first time stamp whenever a packet is received; and
classifying the received packet for each flow registered for time synchronization or the real-time monitoring.

16. The real-time service monitoring method of claim 15, wherein the classifying the switched packet, generating the second time stamp for the classified packet, and transmitting the packet comprises:
classifying the switched Tx packet using the tag of the Tx packet, depending on whether the time-synchronization time stamp or the real-time monitoring time stamp is provided; and
generating the time-synchronization time stamp or the real-time monitoring time stamp depending on the classified Tx packet.

17. The real-time service monitoring method of claim 1, wherein the computing comprises:
computing the real-time monitoring parameter for each registered flow of a real-time service; and
generating the real-time monitoring result based on the computed real-time monitoring parameter; and
control the priority of each registered flow according to the real-time monitoring result.

18. A real-time service monitoring apparatus comprising:
a packet reception and classification block configured to receive a packet transmitted from a source to a destination, and generate a first time stamp of the received packet when the packet is received;
a packet processing and switching block configured to process the received packet into a flow and register the flow in a real-time monitoring database of the real-time service monitoring apparatus;
a packet classification and transmission block configured to transmit the processed packet to the destination, and generate a second time stamp when the processed packet belonging to the registered flow is transmitted to the destination; and
a real-time monitoring block configured to compute a real-time monitoring parameter for each registered flow of a real-time service between the source and the destination based on the first time stamp and second time stamp, the real-time monitoring parameter computed by using the first time stamp and second time stamp within the real-time service monitoring apparatus in real time, and transmit a real-time monitoring result of monitoring the real-time monitoring parameter to a quality of service monitoring server configured to monitor quality of service of the real-time service through the real-time service monitoring apparatus,
wherein a priority of the flow is controlled according to the real-time monitoring result.

19. The real-time service monitoring apparatus of claim 18, wherein the real-time service monitoring apparatus is a router or a switch.

20. The real-time service monitoring apparatus of claim 19, wherein the real-time service monitoring apparatus receives the packet from the source and relays the packet to the destination.

21. The real-time service monitoring apparatus of claim 18, wherein the real-time monitoring block computes any one of a packet loss in equipment, an inter-packet jitter, packet latency in equipment, propagation delay, sequence number, and a bandwidth for the each flow using the first time stamp and second time stamp, in order to perform a real-time monitoring of the quality of service of the real-time service through the real-time service monitoring apparatus.

22. The real-time service monitoring apparatus of claim 18, wherein the real-time monitoring block is further configured to compute the real-time monitoring parameter for each registered flow of a real-time service generate the real-time monitoring result based on the computed real-time monitoring parameter, and control the priority of each registered flow according to the real-time monitoring result.

* * * * *